United States Patent [19]

Hackett

[11] 4,218,233
[45] Aug. 19, 1980

[54] METHOD FOR DEODORIZING POULTRY HOUSES

[75] Inventor: William C. Hackett, London, Ohio

[73] Assignee: G. D. Searle & Co., Skokie, Ill.

[21] Appl. No.: 712,613

[22] Filed: Aug. 9, 1976

[51] Int. Cl.³ .............................................. C05F 11/08
[52] U.S. Cl. ............................................. 71/9; 71/13; 71/21; 71/3
[58] Field of Search ...................... 71/1, 8, 9, 13, 21, 71/22, 3

[56] References Cited

FOREIGN PATENT DOCUMENTS

| | | | |
|---|---|---|---|
| 2448126 | 4/1976 | Fed. Rep. of Germany | 71/9 |
| 6902007 | 8/1970 | Netherlands | 71/21 |
| 301105 | 11/1928 | United Kingdom | 71/21 |
| 822683 | 10/1959 | United Kingdom | 71/9 |

*Primary Examiner*—Ferris H. Lander
*Attorney, Agent, or Firm*—John J. McDonnell; Albert Tockman

[57] ABSTRACT

The present invention encompasses a method for reducing offensive odors in poultry houses comprising adding at least 10 pounds of composted cow manure per ton of poultry manure. The method of the present invention substantially reduces offensive odor in poultry houses especially ammonia odor and thereby provides a healthier environment for poultry and poultry workers. Since the ammonia loss to the environment is reduced, the nitrogen is retained in the poultry manure providing a product with higher nitrogen content.

4 Claims, No Drawings

METHOD FOR DEODORIZING POULTRY HOUSES

The present invention encompasses a method for deodorizing a poultry house comprising adding at least 10 pounds of cow manure composted with thermophilic aerobic bacteria per ton of poultry manure. The method of the present invention substantially reduces offensive odor in poultry houses especially ammonia odor and thereby provides a healthier environment for poultry and poultry workers. Since the ammonia loss to the environment is reduced and the nitrogen is retained in the poultry manure, providing a product with higher nitrogen content.

In effect the present invention involves inoculating poultry excreta with an effective odor controlling amount of thermophilic aerobic bacteria.

Poultry houses are generally arranged with excreta pits below a long series of cages. Typically 60,000 layers will produce about 6-7 tons of excreta per day. Initially the excreta has about 60-65% moisture content and compacts rather closely in the pits. The pits are periodically cleaned and the manure is most generally used as fertilizer.

Untreated fresh excreta from poultry houses has a nitrogen:potassium:phosphorous (N:P:K) ratio of about 5.5:2.8:1.7. The excreta, if untreated, gradually decomposes giving offensive odors especially ammonia. The ammonia loss results in a lower percentage of nitrogen in the residual manure. Ammonia levels in untreated poultry houses commonly reach 30-100 ppm. Ammonia has many adverse effects on poultry. It causes respiratory distress, inhibits egg shell quality, reduces egg production, and renders poultry more susceptible to other diseases. The ammonia levels in houses where the pits are treated according to the present invention typically are below 20 ppm. Thus, reduction of ammonia as well as other offensive odor levels in poultry houses provides a healthier environment for the poultry and poultry workers alike.

Composted animal manure suitable for practicing the present invention is animal manure which has been composted with aerobic thermophilic bacteria at a temperature about 160° for a few days. A preferred composted animal manure is cow manure composted with aerobic thermophilic bacteria at 160° F. for 6-7 days and stabilized for 20-30 days. The product should be finely divided for easy spreading on the excreta pits. The cow manure may optionally contain wood chips, saw dust, ground corn stalks, rice hulls or other cellulose sources intermixed.

The composted animal manure may be spread by hand or by mechanical spreader. Typically 80 pounds of composted cow manure is spread by hand on pits of 8,000 chickens or about 80 pounds per 6-7 tons of excreta. 10 pounds of composted cow manure per ton of poultry excreta (0.5%) is effective. 1% of composted cow manure is a highly effective amount. Larger amounts of composted cow manure produce better results. For example, the clean pits can be lined with a layer of about ¼ to ½ inch of composted cow manure and periodically layered with smaller amounts of composted cow manure. In fact, intermixing composted cow manure having a moisture content of 20-30% with poultry excreta having a moisture content of 60-65% to that the final moisture content is 50-55% produces material which itself can be composted by aerobic thermophilic bacteria at pasteurizing temperatures to provide a high nitrogen fertilizer or an animal feed.

Preferably 5-50% cow manure which has been composted with aerobic thermophilic bacteria at pasteurizing temperatures is suitable for mixing with and composting poultry manure. Optionally, saw dust, ground corn stalks, rice hulls, wood chips or other sources of cellulose may be added to the composted cow manure-chicken excreta compost.

Evidently treatment with suitable composted cow manure provides seeding with aerobic thermophilic bacteria which grow at the expense of odor causing anaerobic organisms in the poultry excreta pits.

EXAMPLE 1

A house of 8,000 cage layers producing about 1 ton of 60% moisture poultry manure a day was selected for treatmet. 100 pounds of cow manure composted under aerobic conditions at thermophilic temperatures is scattered by hand over the surface of the pits once a week. Soon after the first treatment the poultry manure odor was reduced in the house. After twelve weeks of treatment at weekly intervals the house was cleaned by removing the treated manure from the pits.

For a few days after the untreated pits are cleaned the odor is very offensive. However, treating freshly cleaned pits with finely divided cow manure composted under aerobic conditions at thermophilic temperatures greatly reduces these offensive odors.

EXAMPLE 2

Ammonia levels in poultry houses treated with composted cow manure as described in Example 1 had ammonia level of 10-20 ppm. Untreated houses had ammonia levels of 20-50 ppm as determined by litmus paper ammonia test kit.

EXAMPLE 3

| Sample | Odor Reduced | % Moisture | % Dry | % Protein | N% (Dry) | K% | P% |
|---|---|---|---|---|---|---|---|
| Untreated (fresh) | No | 76.2 | 34.9 | 8.3 | 5.6 | 2.8 | 1.7 |
|  | No | 75.0 | 33.6 | 8.4 | 5.4 | 2.9 | 1.8 |
| Micro Aid* | Yes | 61.4 | 26.7 | 10.3 | 4.3 | 4.2 | 2.4 |
|  | Yes | 58.5 | 28.2 | 11.7 | 4.5 | 3.8 | 2.5 |
| Composted Raw Manure | Yes | 56.8 | 28.2 | 12.2 | 4.5 | 3.4 | 2.4 |
| 80 lbs/6-7 tons | Yes | 55.8 | 31.0 | 13.7 | 5.0 | 3.4 | 1.9 |

*Saponin extracted from Yucca plant sold under the trade name Micro-Aid reduces odor but also permits the reduction of nitrogen content.

What is claimed is:

1. A method for reducing offensive odors in poultry houses comprising adding at least 0.5% by weight of finely divided cow manure which has been composted by thermophilic aerobic bacteria to poultry excreta.

2. A method for reducing offensive odors in poultry houses comprising seeding poultry excreta with an effective odor controlling amount of thermophilic aerobic bacteria from composted cow manure.

3. A method for reducing offensive odors in poultry houses comprising sprinkling about 10 pounds of finely divided cow manure which has been composted with thermophilic aerobic bacteria on each ton of poultry excreta.

4. A method for composting poultry excreta comprising intermixing 5-50% by weight cow manure which has been composted with thermophilic aerobic bacteria with the poultry excreta and composting the mixture for about 6 days, said composting mixture retained at a temperature of 160° F. or more by intermittently admitting air into the composting mixture.

* * * * *